(12) United States Patent
Roux et al.

(10) Patent No.: US 11,967,437 B2
(45) Date of Patent: Apr. 23, 2024

(54) CONTROL ROD POSITION INDICATION SYSTEM FOR A NUCLEAR REACTOR

(71) Applicant: FRAMATOME GmbH, Erlangen (DE)

(72) Inventors: Jean-Luc Roux, Herzogenaurach (DE); Patrick Köhler-Soto, Nuremberg (DE); Stefan Schön-Wälder, Erlangen (DE)

(73) Assignee: FRAMATOME GmbH, Erlangen (DE)

( * ) Notice: Subject to any disclaimer, the term of this patent is extended or adjusted under 35 U.S.C. 154(b) by 339 days.

(21) Appl. No.: 17/609,611

(22) PCT Filed: Jun. 19, 2019

(86) PCT No.: PCT/EP2019/066245
§ 371 (c)(1),
(2) Date: Nov. 8, 2021

(87) PCT Pub. No.: WO2020/253956
PCT Pub. Date: Dec. 24, 2020

(65) Prior Publication Data
US 2022/0223306 A1 Jul. 14, 2022

(51) Int. Cl.
*G21C 17/12* (2006.01)
*G01D 5/251* (2006.01)
*G21C 17/10* (2006.01)

(52) U.S. Cl.
CPC ........... *G21C 17/12* (2013.01); *G01D 5/2515* (2013.01); *G21C 17/10* (2013.01)

(58) Field of Classification Search
CPC ....... G21C 17/12; G21C 17/10; G01D 5/2515
USPC ........................................................ 376/258
See application file for complete search history.

(56) References Cited

U.S. PATENT DOCUMENTS

| | | | |
|---|---|---|---|
| 3,976,963 A | 8/1976 | Kubler | |
| 4,064,451 A | 12/1977 | Foxworthy | |
| 5,629,659 A | 5/1997 | Steiner | |
| 6,571,626 B1 | 6/2003 | Herford | |
| 9,151,591 B2 | 10/2015 | Reymann | |
| 9,976,411 B2 | 5/2018 | Flow | |
| 2005/0068133 A1 | 3/2005 | Romanik et al. | |

FOREIGN PATENT DOCUMENTS

DE 2521340 A1 11/1976

OTHER PUBLICATIONS

Corresponding Search Report and Written Opinion for PCT/EP2019/066245.

*Primary Examiner* — Jack W Keith
*Assistant Examiner* — Daniel Wasil
(74) *Attorney, Agent, or Firm* — Davidson, Davidson & Kappel, LLC

(57) ABSTRACT

A control rod position indication system is for a nuclear reactor with a reactor core and at least one control rod which is movable along a linear path of movement for controlling reactivity of the core. The system includes a permanent magnet mounted on the control rod or a corresponding drive rod, and a number of reed switches arranged around the path of movement in order to be switched by a magnetic field generated by the permanent magnet when passing by. The permanent magnet has a north-south axis whose orientation is constant during movement, and the respective reed switch has a number of reed contacts which are aligned along a longitudinal axis. The longitudinal axis of at least one reed switch is inclined relative to the north-south axis of the permanent magnet, and the angle of inclination has an absolute value within a range from 15 to 65 degrees.

6 Claims, 4 Drawing Sheets

CONTROL ROD POSITION INDICATION SYSTEM FOR A NUCLEAR REACTOR

The present disclosure relates to a control rod position indication system for a nuclear reactor and to an according nuclear reactor.

BACKGROUND

A nuclear reactor comprises a reactor core whose reactivity can be controlled, amongst others, by a number of control rods. Typically, the according control rod is movable along a linear path of movement into the reactor core. A reliable and precise assessment or measurement of the current control rod position is of paramount importance for safe reactor operation. This is a difficult task since a control rod is usually enclosed by a pressure housing, so that indirect or contactless sensors are required. Usually, there is only limited installation space for the sensors. Furthermore, physical working conditions with respect to, for example, temperature and radiation are demanding. These conditions may also vary considerably in time.

Besides Rod Position Indication (RPI) systems based on inductive sensors there are according systems based on reed switches. A reed switch is an electrical switch operated by an applied magnetic field. Typically, a reed switch has a number of reed contacts which are aligned along a centerline or longitudinal axis. In the context of an RPI system, there is a permanent magnet with a magnetic north-south axis mounted on the control rod or a corresponding drive rod connected to the control rod. A number of reed switches are arranged around the path of movement in order to be switched by the magnetic field generated by the permanent magnet when passing by, thereby allowing determination of the control rod position.

U.S. Pat. No. 4,064,451 A discloses a position indication system according to the preamble of claim 1. Here, the reed switches S1 to S72 are arranged perpendicular to the north-south axis of the permanent magnet 10 (FIG. 1).

DE 25 21 340 A1 shows a similar arrangement, wherein the reed switches 6 are arranged in parallel to the north-south axis of the permanent magnet 5 (FIG. 2).

SUMMARY

A problem occurring with these systems is that for certain positions of the control rod no reliable position indication can be derived, since in a series of subsequent measurements for the same position—but possibly with varying physical conditions as mentioned above—the according reed switch can be either be found to be in an open or a closed state.

It is an objective of the present disclosure to provide a control rod position indication system of the above-mentioned kind with improved reliability and/or detection accuracy. In particular, position ranges wherein the corresponding reed switch is neither surely open nor surely closed shall be as small as possible.

Correspondingly, a key element of the present disclosure is that the longitudinal axis of at least one of the reed switches is inclined or slanted or tilted or skewed or oblique relative to the north-south axis of the permanent magnet, wherein the angle of inclination has an absolute value which is within a range from 15 to 65 degrees.

Surprisingly, it has been found by numerical simulations that an arrangement according to the present disclosure improves the detection accuracy of the position indication system. In particular, for a tilted reed switch the position region of the assigned control rod with undefined switching status is considerably smaller than for a non-tilted reed switch. This is because the tilted orientation takes into account interfering magnetic fields (like stray fields) from other sources than the permanent magnet. This has been confirmed by experimental measurements.

In a preferred embodiment, the absolute value of the angle of inclination is within a range around a preferred value of 35 degrees, in particular in the range from 30 to 40 degrees.

In another preferred embodiment, the north-south axis of the permanent magnet is arranged in parallel to the path of movement, which means that the longitudinal axis of the according reed switch is tilted relative to the axis of the control rod or drive rod.

In one expedient configuration, all the reed switches belonging to the same control rod or drive rod are inclined in the same manner. However, in other configurations it may be advantageous to adjust the angle of inclination individually for each of the reed switches. This allows fine-tuning of the detection accuracy depending on the local point of installation.

In yet another preferred embodiment, a plurality of reed switches are arranged at the same axial position of the control rod or drive rod to provide redundant information. In contrast to RPI systems based on inductive sensors this is possible due to the compact size of the reed switches.

In a preferred application, there is nuclear reactor comprising a reactor core and at least one control rod which is movable along a linear path of movement for controlling the reactivity of the reactor core, and further comprising a control rod position indication system of the above-described kind. For example, the nuclear reactor may be a pressurized water reactor, in particular of the type 'European Pressurized Water Reactor' (EPR).

BRIEF SUMMARY OF THE DRAWINGS

Exemplary embodiments of the present disclosure and related advantages are subsequently described with reference to the accompanying drawings.

DETAILED DESCRIPTION

Figure 1:
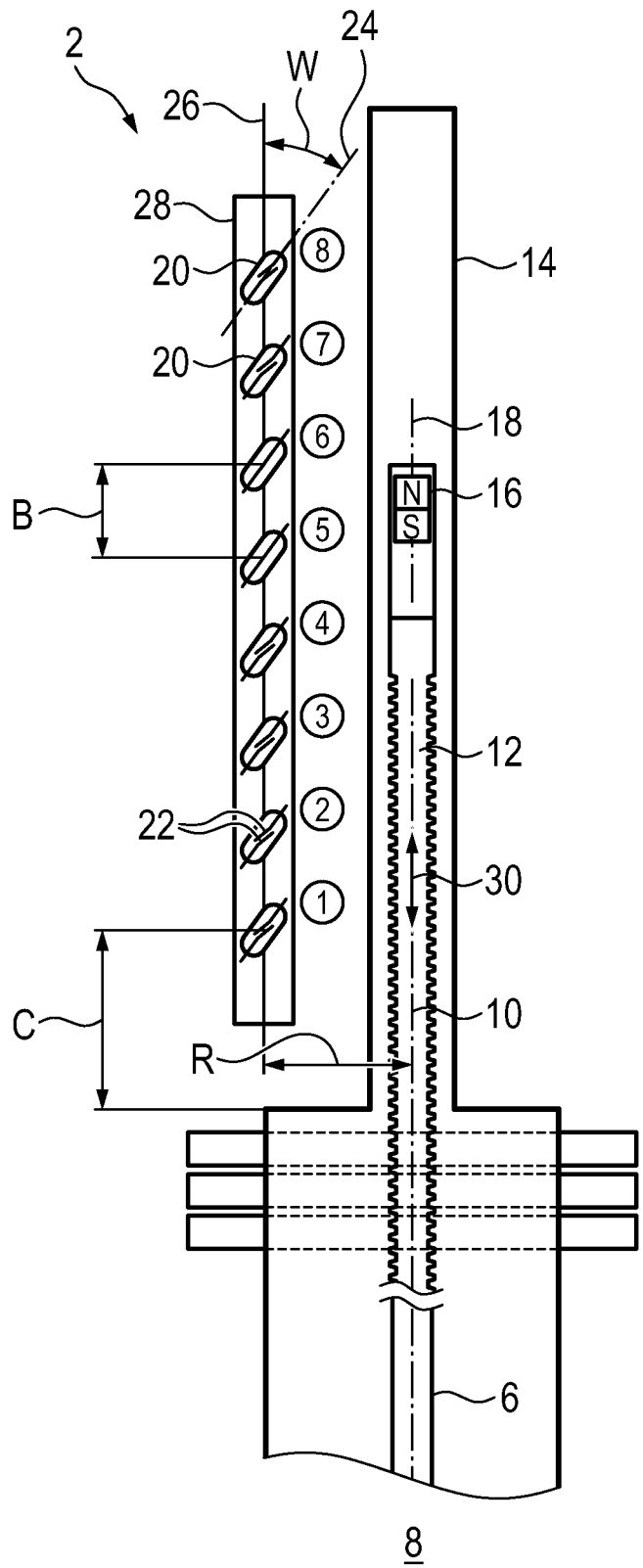
FIG. 1 shows a sensor arrangement of a control rod position indication system within a nuclear reactor.

FIG. 1 gives a schematic overview of relevant elements of a control rod position indication system 2 within a nuclear reactor 4. A control rod 6, only partially shown here, is provided for controlling the reactivity of the reactor core 8 which is indicated purely schematically in the drawing. To this end, the control rod 6 is movable back and forth along a linear path of movement, along its axis 10, between a retracted position and an extended position reaching at least partially into the reactor core 8. The control rod 6 is firmly connected or coupled to a drive rod 12 which effectively forms an extension of the control rod 6 along the same axis 10. The combination or unit of control rod 6 and drive rod 12 may also be regarded as a single rod which is movable in axial direction (along the direction of the arrow 30). Such movement is effected by a corresponding driving motor (not shown here) acting on the drive rod 12. The control rod 6 and the drive rod 12 are enclosed by a sealed pressure housing 14 which is magnetically permeable. In particular, the drive rod 12 is enclosed by a cylindrical drive rod housing. In the shown example of a pressurized water reactor, the control rod 6 is arranged to be lowered into the reactor core below 8. Therefore, the drive rod 12 is above the control rod 6, and both are aligned along the same vertical axis 10. In other words, the path of movement is aligned vertically. However, such details may vary with different reactor types and are not integral to the working of the present disclosure.

To provide a reliable position indication for the current position of the control rod 6, there is a control rod position indication 2 system based on reed switches.

The control rod position indication system 2 comprises a permanent magnet 16 mounted on the drive rod 12 (or, less preferred, on the control rod 6). Hence, the permanent magnet 16 moves together with the unit made of drive rod 12 and control rod 6 along the linear path of movement within the enclosure formed by the pressure housing 14. The permanent magnet 16 is preferably a strong Samarium-Cobalt (e.g. $Sm_2Co_{17}$) magnet or made of similar rare earth materials. The permanent magnet 16 has a magnetic north pole N and a magnetic south pole S aligned along a magnetic north-south axis 18. Due to the rigid connection of the permanent magnet 16 to the drive rod 12, the orientation of the north-south axis 18 is constant along its path of movement.

Furthermore, there is a number of reed sensors or reed switches 20 arranged around the path of movement in order to be switched by the magnetic field generated by the permanent magnet 16 when passing by. The respective reed switch 20 has a number of reed contacts 22 which are essentially aligned along a longitudinal axis 24 or reed axis. The reed switches 20 are arranged outside the pressure housing 14 with some lateral distance to it. There is preferably a multitude of reed switches 20 spread evenly across the maximum travel distance of the permanent magnet 16, the reed switches 20 preferably being located along an installation line 26 or installation axis which is parallel to the rod axis 10, thereby forming a reed chain. Such a mounting is achieved, for example, by virtue of a suitable fitting panel 28 or fitting tube. This way, a discretized position indication can be obtained on the basis of the sensed position of the permanent magnet 16, as can be concluded from the exemplary circuit diagram of FIG. 2.

For example, the reed switches 20 are of the type 'normally open' and get closed only under the magnetic influence of the nearby permanent magnet 16. Hence, a situation like in FIG. 2 may occur, wherein two adjacent reed switches 20 of the reed chain are closed while the rest is in an open state. This may be detected, for example, by placing the reed switches 20 within the output lines of an electric resistor voltage divider circuit (with individual resistors 32), such that depending on the individual switching states a first resistance circuit (with total resistance R1) and/or a second resistance circuit (with total resistance R2) are formed. For resistance measurement a potentiometric measurement device may be used. Therefore, the measured resistance of the resistance circuit(s) provides an indication of the position of the permanent magnet 16, and thus of the control rod 6. The necessary calculations are performed in a corresponding analysis unit and the results are displayed on a corresponding display not shown here.

In practice, however, a few complications may arise which may render the measured sensor signals and thus the position indication dubious. There can be situations, wherein for a given position of the permanent magnet 16 the corresponding reed switches 20 are neither surely open nor surely closed, in particular under the influence of varying operating conditions such as temperature and/or radiation.

For example, for a given configuration and a given rod position reed switch positions no. 1, 2, 3, 8 (encircled numbers in FIG. 1) correspond to reed switches 20 at such a distance from the permanent magnet 16 that the switches cannot be closed. Reed switch positions no. 5, 6 correspond to reed switches 20 at such a distance from the permanent magnet 16 that the switches are closed for sure. Reed switch positions no. 4, 7 correspond to reed switches 20 at such a distance from the permanent magnet 16 that the switches may be closed, but not for sure.

This makes the design of the control rod position indication system 2 and the specification of according design parameters non-trivial.

Firstly, there are physical design parameters such as:
field strength of the permanent magnet 16
response threshold (=pull-in value) of the reed switches 20
hysteresis of the reed switches 20
manufacturing tolerance of the reed switches 20
temperature dependence of above parameters
influence of the periphery: in particular neighboring control rod drives and according magnets or magnetized components Secondly, there are geometric parameters such as (see FIG. 1):
distance or height B between two adjacent reed switches 20
distance R between the reed switches 20 and the permanent magnet 16
tilting of the reed-switches 20

Figure 2:
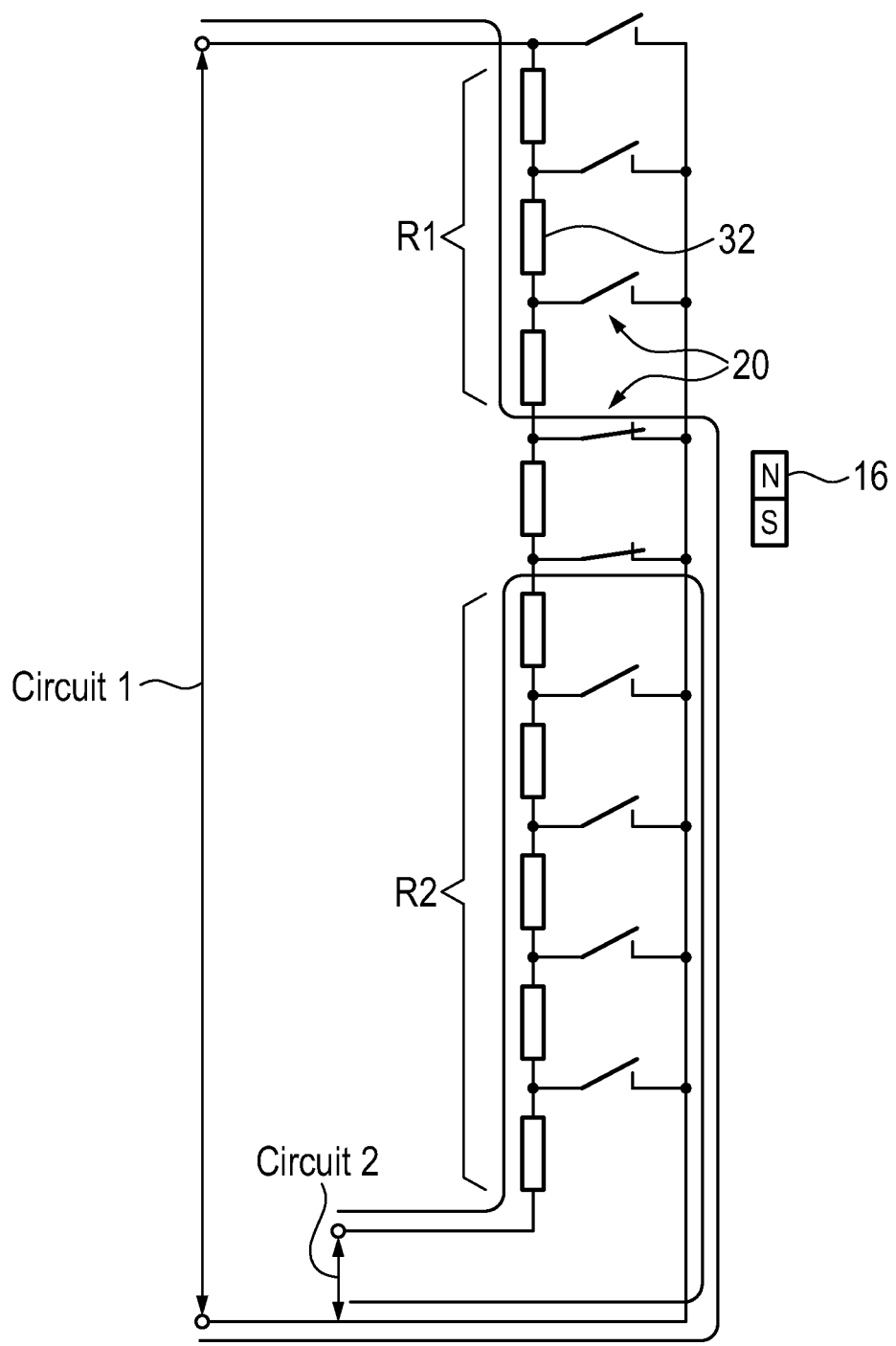
FIG. 2 shows a corresponding circuit diagram for the sensor arrangement shown in FIG. 1.

Surprisingly, it was found that the tilting of the reed-switches 20 has a significant impact on the operation and reliability of the control rod position indication system 2. During simulations and experiments it was concluded that position ranges wherein the corresponding reed switch 20 is neither surely open nor surely closed are minimized by choosing its longitudinal axis 24 to be inclined relative to the north-south axis 18 of the permanent magnet 16. In general, good results are obtained when the absolute value of the angle of inclination W is within a range from 15 to 65 degrees. A preferred sub-range lies within 30 to 40 degrees. In particular, the permanent magnet 16 is preferably mounted such that the magnetic north-south axis 18 is aligned vertically (i.e. parallel to the axis 10 of the drive rod 12), and the respective reed switch 20 is tilted against the vertical direction with an angle of inclination W of said size, as indicated in FIG. 2. A reversed tilting corresponding to negative W values shows equally strong influence on the open/close state of the reed switches 20 and may also be employed, just like a tilting in positive W direction. Preferably, the tilting is such that that the longitudinal axis 24 of the reed switch 20 remains within the plane that contains the north-south axis 18 of the permanent magnet 16. That is, secondary tilting or twisting in other directions is preferably avoided.

Figure 3:
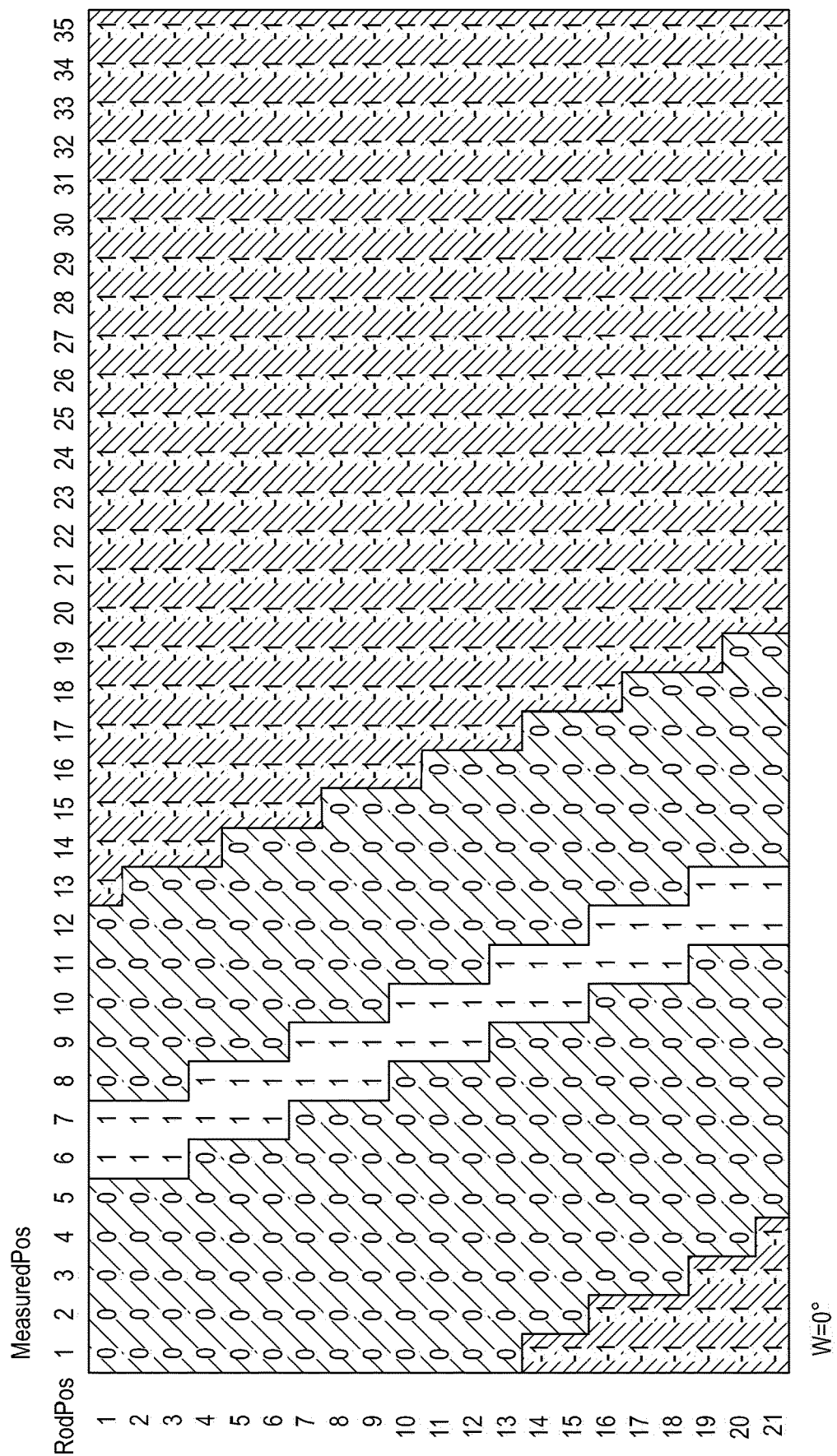
FIG. 3 shows a diagram illustrating a domain of uncertainty for position indications provided by the control rod position indication system of FIG. 1 at a given set of operating parameters.
Figure 4:
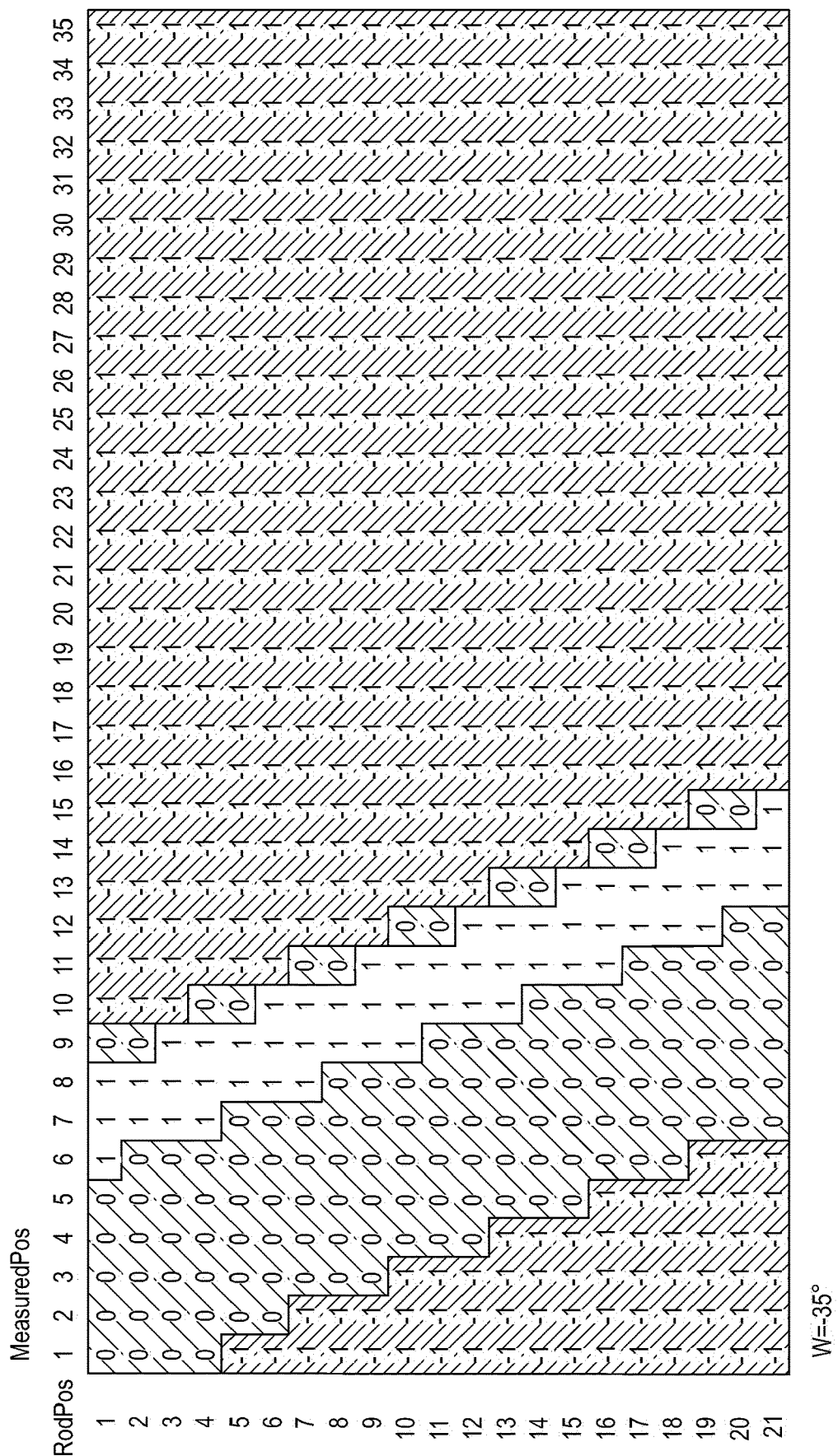
FIG. 4 shows a similar diagram for a different set of operating parameters.

As can be seen by the diagrams shown in FIG. 3 and FIG. 4, for a tilted reed switch (W=−35°) the position region with undefined (value zero) switching status is considerably smaller than for a non-tilted reed switch (W=0°). In these diagrams the x-coordinate (MeasuredPos 1-35) represents the vertical position (similar to the encircled position numbers in FIG. 1) of the respective reed switch 20 in the reed chain, whereas the y-coordinate (RodPos 1-21) represents the rod position, specified as multiples of an elementary step (e.g. 3 cm), relative to a given home position (e.g. deepest position). The switching state (surely open, undefined, surely closed) of the reed switch is indicated by values (−1,0,1) and according textures. This is because the tilted orientation effectively takes into account radial and axial components of interfering magnetic fields (like stray fields) from other sources than the permanent magnet. This has been confirmed by experimental measurements.

In summary, by tilling the reed switches 20 in the above-described manner the domain of uncertainty can be considerably reduced, and thus the position indication 2 is made more reliable and accurate.

LIST OF REFERENCE NUMERALS

2 control rod position indication system
4 nuclear reactor
6 control rod
8 reactor core
10 rod axis
12 drive rod
14 pressure housing
16 permanent magnet
18 north-south axis
20 reed switch
22 reed contact
24 longitudinal axis
26 installation line
28 fitting panel
30 arrow
N north pole
S south pole
B distance
R distance
W angle of inclination

What is claimed is:

1. A nuclear reactor comprising:
   a reactor core;
   at least one control rod which is movable along a linear path of movement for controlling the reactivity of the reactor core; and
   a control rod position indication system comprising:
      a permanent magnet mounted on the control rod or a corresponding drive rod; and
      a number of reed switches arranged around the path of movement in order to be switched by a magnetic field generated by the permanent magnet when passing by,
      the permanent magnet having a north-south axis whose orientation is constant during movement, and the respective reed switch having a number of reed contacts which are aligned along a longitudinal axis,
      the longitudinal axis of at least one of the reed switches being inclined relative to the north-south axis of the permanent magnet, and the angle of inclination having an absolute value within a range from 15 to 65 degrees.

2. The nuclear reactor according to claim 1, wherein the nuclear reactor is a pressurized water reactor.

3. The nuclear reactor according to claim 1, wherein the absolute value of the angle of inclination is within a range from 30 to 40 degrees.

4. The nuclear reactor according to claim 1, wherein the north-south axis of the permanent magnet is arranged in parallel to the path of movement.

5. The nuclear reactor according to claim 1, wherein all the reed switches are inclined in a same manner.

6. The nuclear reactor according to claim 1, wherein a plurality of the reed switches are arranged at a same axial position of the control rod or the drive rod to provide redundant information.

* * * * *